(12) United States Patent
Stormer et al.

(10) Patent No.: US 12,728,799 B2
(45) Date of Patent: Sep. 8, 2026

(54) ACCESSORY SYSTEM FOR VEHICLE

(71) Applicant: GM Global Technology Operations LLC, Detroit, MI (US)

(72) Inventors: Conner James Stormer, Detroit, MI (US); Thiago Canola Afonso, Sterling Heights, MI (US); Vincent Keanan Traina, Bloomfield Hills, MI (US); Miranda Paige Suman, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 449 days.

(21) Appl. No.: 18/458,372

(22) Filed: Aug. 30, 2023

(65) Prior Publication Data

US 2025/0074326 A1 Mar. 6, 2025

(51) Int. Cl.

| | |
|---|---|
| ***B60R 11/00*** | (2006.01) |
| ***B60H 1/24*** | (2006.01) |
| ***B60H 1/34*** | (2006.01) |
| *B60H 1/00* | (2006.01) |

(52) U.S. Cl.

CPC .......... *B60R 11/00* (2013.01); *B60H 1/00592* (2013.01); *B60H 1/242* (2013.01); *B60H 1/34* (2013.01); *B60R 2011/0005* (2013.01); *B60R 2011/0007* (2013.01); *B60R 2011/0057* (2013.01)

(58) Field of Classification Search

CPC ............. B60R 11/00; B60R 2011/0005; B60R 2011/0007; B60R 2011/0008; B60H 1/00592; B60H 1/242; B60H 1/247; B60H 1/34; B60H 1/3414

USPC ............. 296/37.12, 1.07; D12/192; D23/327

See application file for complete search history.

(56) References Cited

U.S. PATENT DOCUMENTS

| | | | | |
|---|---|---|---|---|
| 3,916,639 A * | 11/1975 | Atkinson | B60N 3/104 | 62/331 |
| 5,154,617 A * | 10/1992 | Suman | H01R 31/08 | 296/37.7 |
| 5,673,526 A * | 10/1997 | Schiedegger | F24F 7/02 | 52/473 |
| 6,338,517 B1 * | 1/2002 | Canni | B60R 7/04 | 224/311 |
| 6,394,526 B1 * | 5/2002 | Gyllenspetz | B60K 35/50 | 296/70 |
| 6,634,692 B1 * | 10/2003 | Barat | B60K 37/00 | 296/70 |
| 6,669,260 B2 * | 12/2003 | Clark | B60R 11/02 | 224/311 |

(Continued)

FOREIGN PATENT DOCUMENTS

| | | |
|---|---|---|
| CN | 2142801 Y | 9/1993 |
| CN | 212332325 U | 1/2021 |

*Primary Examiner* — Gregory A Blankenship
(74) *Attorney, Agent, or Firm* — Honigman LLP; Matthew H. Szalach

(57) ABSTRACT

An accessory system for a vehicle includes a housing having a base attached to the vehicle and a projection extending from the base, the projection being fluidly coupled to a duct of the vehicle. The accessory system also includes a first vehicle accessory having a cavity configured to selectively receive the projection of the housing to selectively attach the first vehicle accessory to the housing in an engaged state.

20 Claims, 5 Drawing Sheets

(56) References Cited

U.S. PATENT DOCUMENTS

| | | | | |
|---|---|---|---|---|
| 7,440,845 | B1 * | 10/2008 | Laverick | B60K 35/22<br>296/37.7 |
| 8,528,271 | B1 * | 9/2013 | Hemmer | E04D 13/178<br>52/95 |
| D780,667 | S * | 3/2017 | Kim | D12/415 |
| 10,232,784 | B1 * | 3/2019 | Mullen | B62D 25/142 |
| 10,279,645 | B1 * | 5/2019 | Nazarian | B60R 11/02 |
| 2008/0148752 | A1 * | 6/2008 | Marginean | B60H 1/00271<br>62/434 |
| 2014/0113537 | A1 * | 4/2014 | Brinas | F24F 13/075<br>454/155 |
| 2015/0124471 | A1 * | 5/2015 | Garcez da Silva | B60Q 3/76<br>362/520 |
| 2018/0086281 | A1 * | 3/2018 | Chiou | F16M 11/041 |
| 2018/0318462 | A1 * | 11/2018 | Bourne | A61L 9/00 |
| 2019/0160986 | A1 * | 5/2019 | Tsai | B60H 1/0025 |
| 2021/0050743 | A1 * | 2/2021 | Min | B60R 11/0241 |
| 2021/0178862 | A1 * | 6/2021 | Alves | B60R 11/02 |
| 2023/0040815 | A1 * | 2/2023 | Zou | B60H 1/3414 |
| 2023/0120109 | A1 * | 4/2023 | Rahmani | B60R 7/04<br>224/567 |
| 2023/0331172 | A1 * | 10/2023 | Jankura | B60R 11/02 |
| 2024/0001863 | A1 * | 1/2024 | Parab | F16M 11/041 |
| 2025/0074326 | A1 * | 3/2025 | Stormer | B60R 11/00 |

* cited by examiner

ACCESSORY SYSTEM FOR VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to accessory mounts and, more particularly, to accessory mounts for selectively securing vehicle accessories within a vehicle cabin.

Conventional vehicles include features that provide vehicle occupants with comfort and entertainment during use of the vehicle. For example, vehicles typically include heating, ventilation, and air conditioning (HVAC) systems that condition air within a cabin of the vehicle. Such HVAC systems include ductwork and at least one fan that cooperate to direct and circulate conditioned air within the cabin of the vehicle. In so doing, cooled and/or heated air may be circulated within the vehicle cabin to heat and/or cool vehicle occupants.

Entertainment systems such as radios and other audio systems may be used throughout the vehicle cabin to allow occupants to listen to music, podcasts, and other media while seated in the vehicle cabin. Further, rear-seat entertainment systems may be associated with second-row seats and/or third-row seats of the vehicle cabin to allow occupants seated in the second-row seats and/or the third-row seats to watch a show or a movie while seated in the vehicle cabin.

Conventional HVAC systems and entertainment systems often incorporate at least one user interface device (UID) such as a screen or display. The screen or display may incorporate a touch screen that allows an occupant to control the HVAC system and/or the entertainment system. In the context of an HVAC system, the display may additionally be used to communicate various environmental conditions such as cabin temperature, outside temperature, and/or fan speed to vehicle occupants. In the context of the entertainment system, one or more displays may be used by second and third-row occupants to watch a show or a movie while seated in the vehicle cabin.

While the foregoing systems adequately provide vehicle occupants with comfort and entertainment while seated in the vehicle cabin, such systems are not configurable within the vehicle cabin. Rather, the ductwork, fan, and/or display (s) are all located at a fixed, permanent location within the vehicle cabin. Further, such systems are often included with a vehicle at the time of vehicle purchase in one or more packages and cannot be individually added or declined. In short, features of the vehicle are typically not optimized for the particular person purchasing the vehicle.

SUMMARY

In one configuration, an accessory system for a vehicle includes a housing having a base attached to the vehicle and a projection extending from the base, the projection being fluidly coupled to a duct of the vehicle. The accessory system also includes a first vehicle accessory having a cavity configured to selectively receive the projection of the housing to selectively attach the first vehicle accessory to the housing in an engaged state.

The accessory system may include one or more of the following optional features. For example, the housing may include a first fastener and the first vehicle accessory may include a second fastener, the second fastener engaging the first fastener when the first vehicle accessory is in the engaged state. In one configuration, the first fastener and the second fastener may be magnets. Additionally or alternatively, the housing may include a first electrical contact and the first vehicle accessory may include a second electrical contact. The first electrical contact may be electrically coupled to the second electrical contact when the first vehicle accessory is in the engaged state.

In one configuration, the projection may include an outer perimeter surface including a plurality of substantially planar surfaces, adjacent substantially planar surfaces of the plurality of substantially planar surfaces being joined to one another at a junction. The plurality of substantially planar surfaces may cooperate to provide the projection with an octagonal shape. Additionally or alternatively, the base may include an outer perimeter having an octagonal shape.

A vehicle may incorporate the accessory system described above.

In another configuration, an accessory system for a vehicle includes a first housing having a base attached to the vehicle and a first projection extending from the base and a second housing having a base attached to the vehicle and a second projection extending from the base, the second housing being spaced apart from the first housing by a first distance. The accessory system further includes a first vehicle accessory having a first cavity configured to selectively receive the first projection of the first housing or the second projection of the second housing to selectively attach the first vehicle accessory to the first housing or the second housing in an engaged state and spaced apart from the first housing and the second housing in a disengaged state and a second vehicle accessory having a second cavity configured to selectively receive the first projection of the first housing or the second projection of the second housing to selectively attach the second vehicle accessory to the first housing or the second housing in an engaged state and spaced apart from the first housing and the second housing in a disengaged state, the second vehicle accessory being interchangeable with the first vehicle accessory.

The accessory system may include one or more of the following optional features. For example, the first housing and the second housing may each include a first fastener and the first vehicle accessory and the second vehicle accessory may each include a second fastener. In this configuration, the second fastener may engage the first fastener when the first vehicle accessory and/or the second vehicle accessory is in the engaged state. The first fastener and the second fastener may be magnets.

In another configuration, the first housing and the second housing may each include a first electrical contact and the first vehicle accessory and the second vehicle accessory may each include a second electrical contact. The first electrical contact may be electrically coupled to the second electrical contact when the first vehicle accessory and/or the second vehicle accessory is in the engaged state.

The first projection and the second projection may each include an outer perimeter surface including a plurality of substantially planar surfaces, adjacent substantially planar surfaces of the plurality of substantially planar surfaces may be joined to one another at a junction. The plurality of substantially planar surfaces may cooperate to provide the first projection and the second projection with an octagonal shape.

A third vehicle accessory may include a first cavity spaced apart from a second cavity by the first distance. The first cavity may be configured to receive the first projection and the second cavity may be configured to receive the second projection when the third vehicle accessory is in an engaged state and the first vehicle accessory and the second vehicle accessory are in the disengaged state.

A vehicle may incorporate the accessory system described above.

In yet another configuration, a vehicle includes an instrument panel, a heating, ventilating, and air conditioning (HVAC) system including a duct supported by the instrument panel, and a housing having a base attached to the instrument panel and a projection extending from the base, the projection being fluidly coupled to the duct. The vehicle may also include a first vehicle accessory having a cavity configured to selectively receive the projection of the housing to selectively attach the first vehicle accessory to the housing in an engaged state.

The vehicle may include one or more of the following optional features. For example, the first vehicle accessory may include an aperture in fluid communication with the duct. Additionally or alternatively, the housing may include a first fastener and the first vehicle accessory may include a second fastener. In this configuration, the second fastener may engage the first fastener when the first vehicle accessory is in the engaged state. Further, the first fastener and the second fastener may be magnets.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
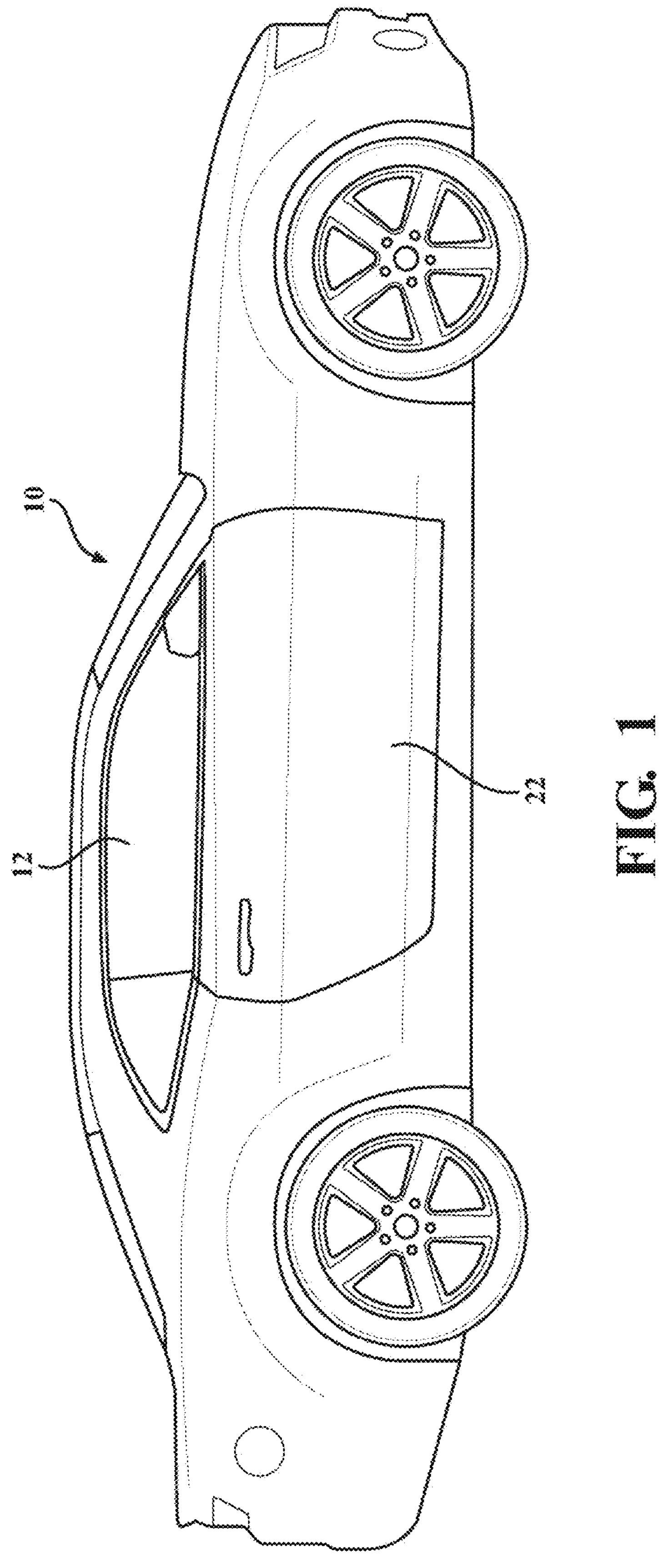
FIG. 1 is a side view of a vehicle in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising." "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to." "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

With reference to FIG. 1, a vehicle 10 is provided and includes a cabin 12 and an instrument panel (IP) 14 located within the cabin 12. The IP 14 includes a series of accessory ports 16 that are disposed at various locations of the IP 14. The accessory ports 16 are configured to selectively receive a vehicle accessory 18 for use by vehicle occupants when seated on a seat 20 of the vehicle 10, as will be described in greater detail below.

Figure 2:
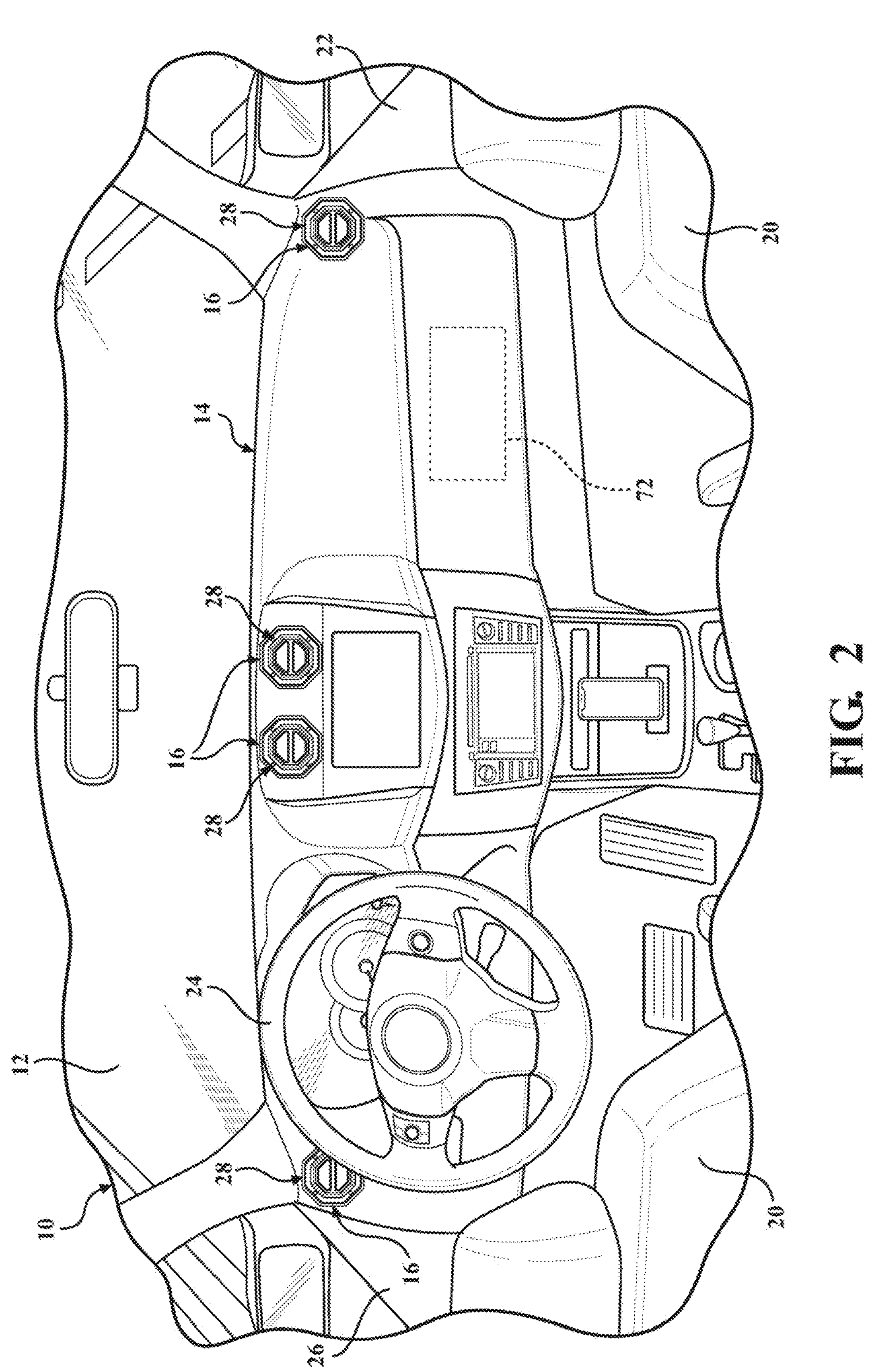
FIG. 2 is a partial perspective view of a cabin of the vehicle of FIG. 1.

As shown in FIG. 2, the accessory ports 16 may be located at discrete locations on the IP 14. For example, two (2) accessory ports 16 are shown as being substantially centrally located on the IP 14 such that a central, longitudinal axis of the vehicle 10 passes between and separates the accessory ports 16. Additionally, another accessory port 16 may be located proximate to a junction of the IP 14 and a passenger door 22. Finally, an accessory port 16 may be located between a steering wheel 24 of the vehicle 10 and a driver-side door 26 of the vehicle 10. While the IP 14 will be described and shown hereinafter as including four (4) accessory ports 16 at the locations illustrated in FIG. 2, the IP 14 could include fewer or more accessory ports 16. Further, the locations of the accessory ports 16 may differ based on the intended use of the accessory ports 16 and/or based on the type of vehicle 10 in which the accessory ports 16 are installed.

The accessory ports 16 may include a housing 28 having a base 30 and a projection 32 extending from the base 30. The base 30 and the projection 32 may be integrally formed with one another and may be formed from a relatively rigid material. For example, the base 30 and the projection 32 may be formed from a plastic and/or a metal material. Alternatively, the base 30 and the projection 32 may be separately formed and subsequently attached to one another. Further, the base 30 and the projection 32 may be formed from different materials. For example, the base could be formed from metal while the projection 32 is formed from plastic. While the base 30 and the projection 32 could be separately formed from one another, the base 30 and the projection 32 will be described and shown hereinafter as being integrally formed with one another. In the configuration shown, the base 30 and the projection 32 are formed from plastic and are integrally formed via an injection-molding process.

The base 30 includes an outer perimeter edge 34 defined by a series of substantially flat surfaces 36. In one configuration, the base 30 includes eight (8) substantially flat surfaces 36 with adjacent surfaces 36 meeting at a junction 38. Accordingly, the eight (8) substantially flat surfaces 36 and associated junctions 38 cooperate to provide the base 30 with an octagonal shape. While the base 30 is described and shown as having an octagonal shape, the base 30 could alternatively have fewer or more substantially flat surfaces 36 defining the outer perimeter edge 34. For example, the outer perimeter edge 34 could include six (6) substantially flat surfaces 36, thereby providing the base 30 with a hexagonal shape.

The base 30 additionally includes a mounting surface 40 and an engagement surface 42 disposed on an opposite side of the base 30 than the mounting surface 40. The mounting surface 40 and the engagement surface 42 are separated by a thickness of the base 30 and are substantially perpendicular to the substantially flat surfaces 36 of the outer perimeter edge 34. Finally, the base 30 includes a series of apertures 44 that extend through a thickness of the base 30 from the mounting surface 40 to the engagement surface 42.

The projection 32 extends from the base 30 in a direction away from the engagement surface 42. As with the base, the projection 32 includes an outer perimeter edge 46 defined by a series of substantially flat surfaces 48. In one configuration, the projection 32 includes eight (8) substantially flat surfaces 48 with adjacent surfaces 48 meeting at a junction 50. Accordingly, the eight (8) substantially flat surfaces 48 and associated junctions 50 cooperate to provide the projection 32 with an octagonal shape. While the projection 32 is described and shown as having an octagonal shape, the projection 32 could alternatively have fewer or more substantially flat surfaces 48 defining the outer perimeter edge 46. For example, the outer perimeter edge 46 could include six (6) substantially flat surfaces 48, thereby providing the projection 32 with a hexagonal shape.

The projection 32 includes a tapered surface 52 extending between the outer perimeter edge 46 and a substantially flat distal end surface 54. The tapered surface 52 provides the projection 32 with an arcuate surface to facilitate insertion of the projection 32 into the vehicle accessory 18, as will be described in greater detail below.

The projection 32 defines an aperture 56 having a similar shape as the outer perimeter edge 46. Specifically, the projection 32 includes substantially planar inner surfaces 58 that cooperate to provide the aperture 56 with a hexagonal shape in a similar fashion as the outer perimeter edge 46. The substantially planar inner surfaces 58 are formed on an opposite side of the projection 32 than respective outer substantially flat surfaces 48 of the projection 32.

In one configuration, a cross-member 60 extends across the aperture 56 and is integrally formed with the base 30 and the projection 32. The cross-member 60 may be aligned with the base 30 such that the cross-member 60 has the same thickness as the base 30. Accordingly, the cross-member 60 may essentially be an extension of the base 30. In this configuration, a portion of the base 30 may extend into the aperture 56 to form a flange 62 that cooperates with the cross-member 60 to define a first aperture 64 and a second aperture 66 each in fluid communication with the aperture 56 defined by the inner surfaces 58 of the projection 32.

Figure 3:
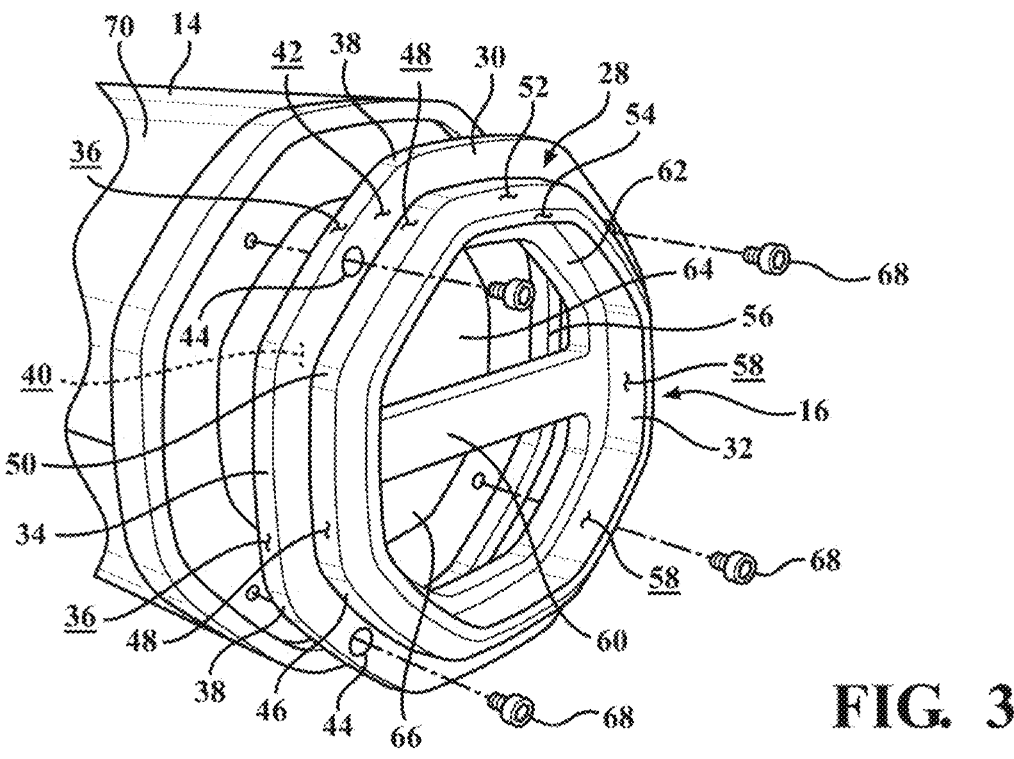
FIG. 3 is an exploded perspective view of an accessory port in accordance with the principles of the present disclosure for use in the cabin of FIG. 2.
Figure 4:
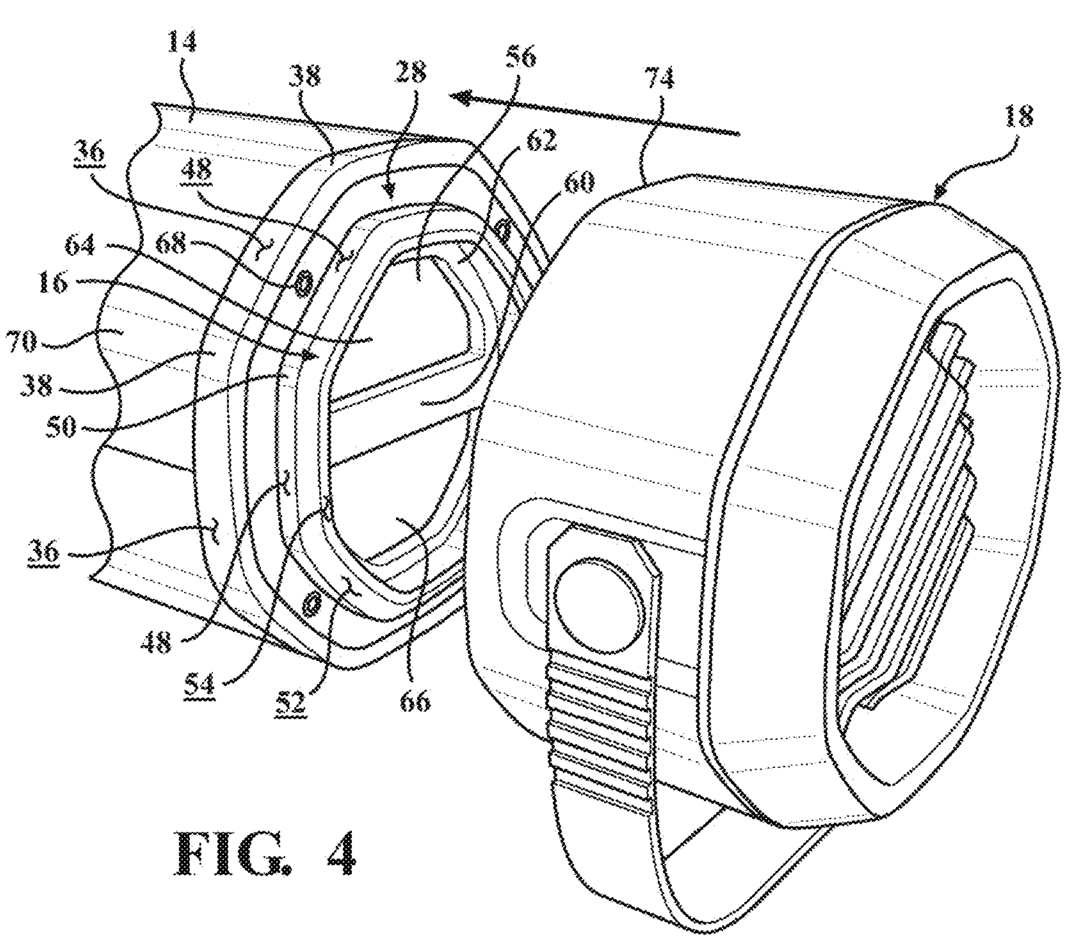
FIG. 4 is a perspective view of the accessory port of FIG. 3 shown in conjunction with a vehicle accessory in a disengaged state.
Figure 5:
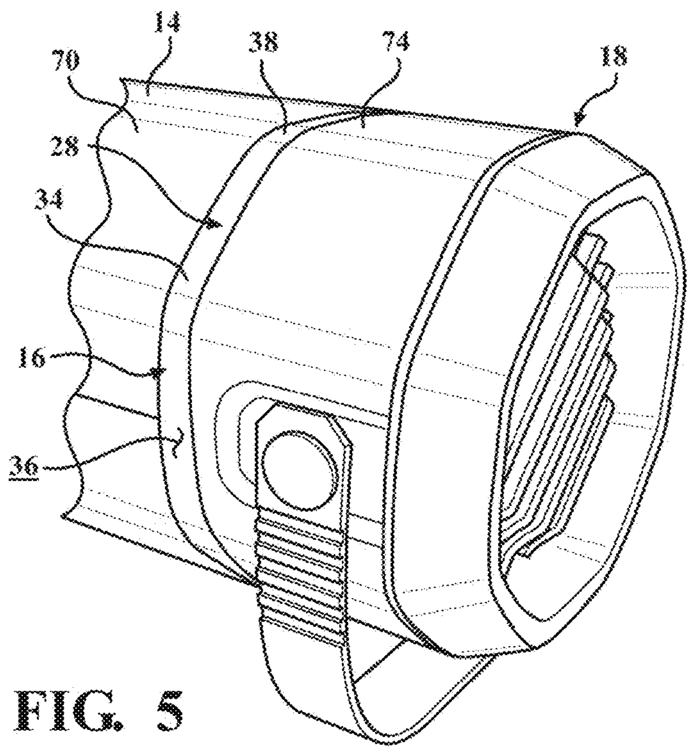
FIG. 5 is a perspective view of the accessory port of FIG. 3 shown in conjunction with a vehicle accessory in an engaged state.
Figure 6:
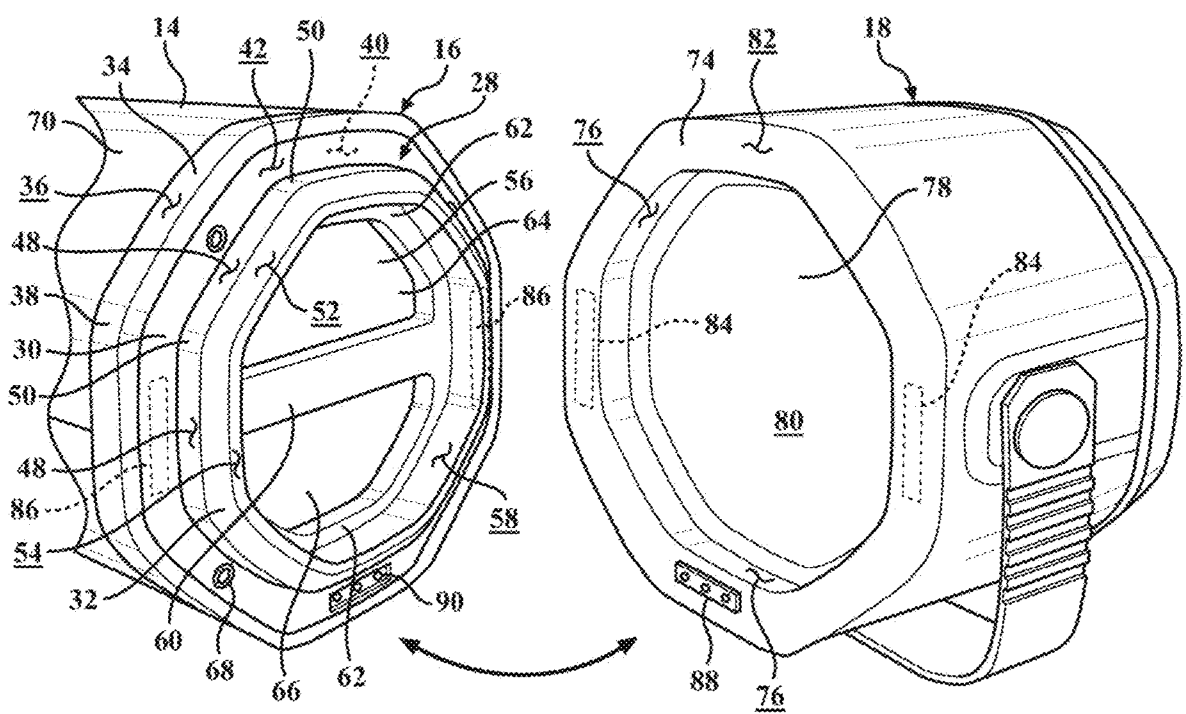
FIG. 6 is a perspective view of the accessory port of FIG. 3 shown in conjunction with a vehicle accessory in a disengaged state to illustrate mating portions of the accessory port and the vehicle accessory.

With particular reference to FIG. 3, the housing 28 is shown as being attached to the IP 14 via a series of fasteners 68. Specifically, the fasteners 68 are received by the apertures 44 of the base 32 to secure the base 30 and, thus, the housing 28 to the IP 14. In the configuration shown in FIGS. 3-6, the housing 28 is shown as being attached to the IP 14 at a distal end of a vehicle duct 70. The duct 70 may be in fluid communication with a heating, ventilating, and air conditioning (HVAC) system 72 of the vehicle 10 (FIG. 2) to allow conditioned air produced by the HVAC system to be expelled into the cabin 12 via the duct 70 and the vehicle accessory ports 16. Specifically, when a fan (not shown) associated with the HVAC system 72 is energized, the fan will direct conditioned air from the HVAC system 72 into the cabin 12 via the duct 70 and the apertures 56, 64, 66 of the vehicle accessory ports 16. As such, the apertures 56, 64, 66 of the vehicle accessory ports 16 are in fluid communication with the duct 70 and with the HVAC system 72 and cooperate with the duct 70 do direct conditioned air into the cabin 12.

The vehicle accessory ports 16 may receive one or more of the vehicle accessories 18 during use of the vehicle 10. The vehicle accessories 18 may include a fan (FIGS. 4 and 5), a portable speaker (FIG. 6), a display (FIG. 7), a cup holder, a cellular telephone mount, or an air conditioning unit. Each of the foregoing vehicle accessories 18 are interchangeable with the other vehicle accessories 18 to allow each vehicle accessory 18 to be attached to and supported by each of the vehicle accessory ports 16. For example, a cellular telephone mount could be interchanged with the fan shown in FIGS. 4-6 by simply removing the fan and replacing the fan with a cellular telephone mount. Each of the vehicle accessories 18 includes the same mounting interface and, as such, can be attached to each of the ports 16 individually.

Each vehicle accessory 18 includes a projection 74 having the same shape as the projection 32 of the housing 28. The projection 74 of the vehicle accessory 18 includes inner surfaces 76 that cooperate to provide the projection 74 with a cavity 78 having an inner perimeter defining an octagonal shape. The surfaces 76 terminate at an engagement surface 80 of the cavity 78 and cooperate with the engagement surface 80 to define a shape and depth of the cavity 78. In one configuration, a depth of the cavity 78 is approximately equal to a height of the projection 32 such that when the projection 32 is received within the cavity 78, the end surface 54 of the projection 32 contacts the engagement surface 80 while an end surface 82 of the projection 74 contacts the engagement surface 42 of the base 30.

The vehicle accessory 18 may include one or more magnets 84 that are positioned within or on the projection 74 or, alternatively, on or within the engagement surface 80 such that each magnet 84 is aligned with a corresponding magnet 86 associated with the housing 28. For example, the magnets 84 of the vehicle accessory 18 are shown as being embedded within the projection 74 proximate to the end surface 82 while the magnets 86 of the housing 28 are shown as being embedded within the base 30. When the vehicle accessory 18 is attached to a vehicle accessory port 16, the magnets 84 of the vehicle accessory 18 interact with the magnets 86 of the vehicle accessory port 16 to hold the vehicle accessory 18 in position and in engagement with the vehicle accessory port 16.

Finally, the vehicle accessory 18 may be powered by the vehicle 10 by placing the vehicle accessory 18 in electrical communication with a power source (not shown) of the vehicle 10. Specifically, an electrical contact 88 of the vehicle accessory 18 may engage an electrical contact 90 of the vehicle 10 when the vehicle accessory 18 is engaged with the vehicle accessory port 16.

In operation, a vehicle owner or occupant can configure the IP 14 to provide specific features at different locations of the cabin 12. For example, an occupant can engage a speaker 18 (FIG. 6) with one of the centrally located accessory ports 16 and may engage a fan 18 (FIGS. 4 and 5) with an accessory port 16 located near the passenger door 22 to increase airflow from the HVAC system 72 to an occupant seated on the passenger seat 20. It should be noted that while the vehicle accessory 18 engaging the accessory port 16 near the passenger door 22 in this example is described as being a fan 18 for use in increasing airflow to a passenger seated on the passenger seat 20, the vehicle accessory 18 could be an air conditioning unit that provides cooled air if the HVAC system 72 is not equipped to provided cooled air to the vehicle cabin 12 or the occupant wishes to supplement the cooled air provided by the HVAC system 72.

The fan 18 and the speaker 18 are attached to the respective accessory ports 16 by inserting the projection 32 of the particular accessory port 16 into the cavity 78 of the particular vehicle accessory 18 (i.e., the fan 18 or the speaker 18). The tapered surface 52 of the projection 32 facilitates insertion of the projection 32 into the cavity 78 and assists in aligning the projection 32 with the surfaces 76 of the projection 74. Once the projection 32 is sufficiently inserted into the cavity 78, the end surface 54 of the projection 32 contacts the engagement surface 80 of the vehicle accessory 18 and the end surface 82 of the vehicle accessory 18 contacts the engagement surface 42 of the accessory port 16. At this point, the magnets 84 of the vehicle accessory 18 interact with the magnets 86 of the base 30 to secure the vehicle accessory 18 to the accessory port 16. Further, the electrical contact 88 of the vehicle accessory 18 is connected to the electrical contact 90 of the accessory port 16.

In the case of the fan 18 (FIGS. 4 and 5), the fan is powered by the vehicle 10 due to connection between the contacts 88, 90. When energized, the fan 18 draws air into the vehicle cabin 12 from the duct 70 and the HVAC system 72 through the apertures 56, 64, 66 of the accessory port 16. In so doing, the fan 18 supplements the fan of the HVAC system 72 by increasing the airflow into the vehicle cabin 12.

The portable speaker 18 (FIG. 6) likewise receives power from the vehicle 10 due to the connection between the contacts 88, 90. When energized, the speaker 18 provides occupants of the vehicle 10 with audio in the form of music, podcasts, and other media. Such media can be transmitted to the speaker 18 from the vehicle 10 via a Bluetooth™ connection between the vehicle 10 and the speaker 18. While the speaker 18 is described and shown as being electrically coupled to the vehicle 10 via the contacts 88, 90, the speaker 18 could alternatively be powered by an internal power source (not shown) to allow the speaker 18 to function independently from the vehicle 10. Further, the speaker 18 could be in communication with a mobile device (not shown) via a Bluetooth™ connection in addition to, or in place of, the connection with the vehicle 10.

The foregoing vehicle accessories 18 can be moved from an engaged state (FIG. 5) to a disengaged state (FIG. 4) by applying a force on the vehicle accessory 18 to overcome the magnets 84, 86. Once the force of the magnets 84, 86 is overcome, the vehicle accessory 18 can be removed from the accessory port 16. At this point, the vehicle accessory 18—if powered by an internal power source—can be used remotely from the accessory port 16 within or external from the vehicle cabin 12. Alternatively, the vehicle accessory 18 can be attached to the same or different accessory port 16 within the vehicle 10 in the manner described above. For example, in the context of the fan 18 (FIGS. 4 and 5), the fan 18 can be disengaged from the accessory port 16 located near the passenger door 22 and moved to the accessory port 16 located near the driver-side door 26 should the driver need an increase of airflow at the driver's seat 20.

Figure 7:
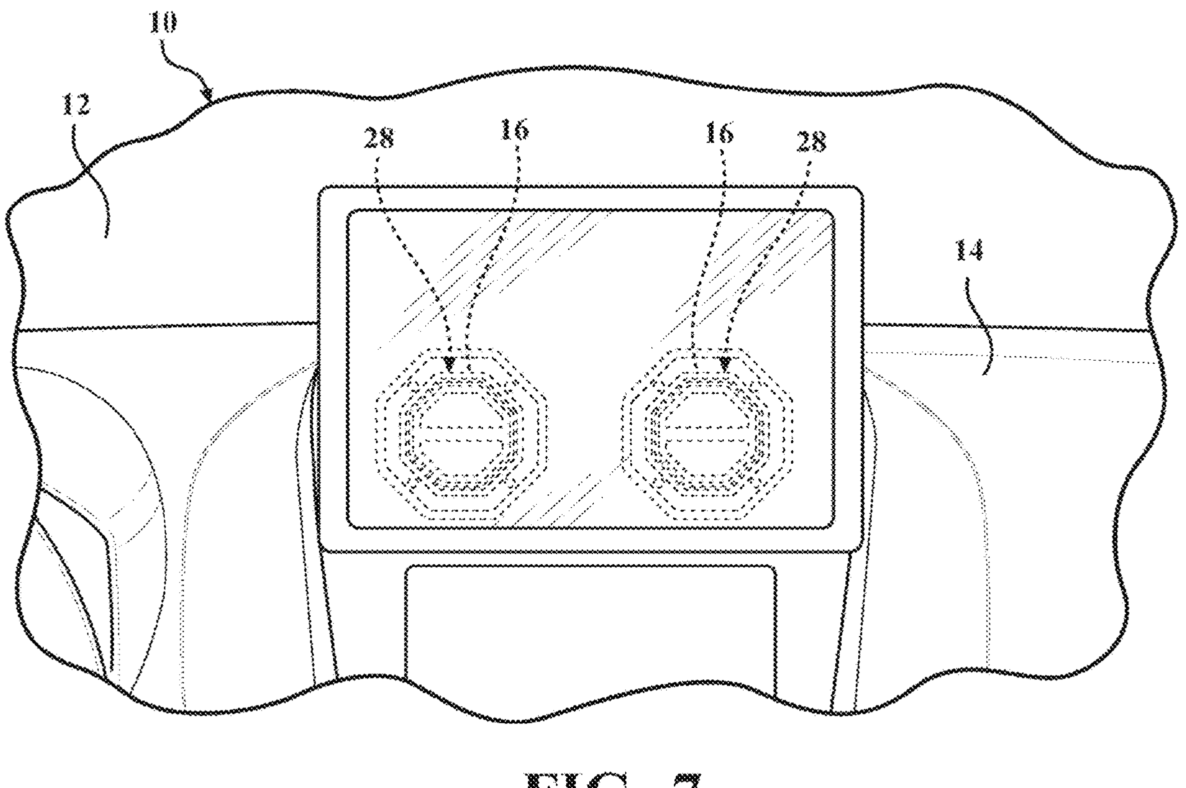
FIG. 7 is a partial perspective view of the cabin of FIG. 2 showing a vehicle accessory engaged with and supported by accessory ports in accordance with the principles of the present disclosure.

While the vehicle accessories 18 have thus far been described as being moved from the disengaged state to the engaged state at a single accessory port 16, multiple accessory ports 16 may be used with a single vehicle accessory 18. For example, in the case of a relatively large vehicle accessory 18 such as a display or screen (FIG. 7), multiple accessory ports 16 may be used simultaneously to support the vehicle accessory 18 during use. In this scenario, the vehicle accessory 18 includes two projections 74 that respectively receive projections 32 of a pair of accessory ports 16. In the example of FIG. 7, the centrally located accessory ports 16 are received by respective cavities 78 of a pair of projections 74 associated with the vehicle accessory 18—namely a display or screen.

As described, the accessory ports 16 may be used in conjunction with a variety of vehicle accessories 18 to allow an occupant to customize an IP 14 of the vehicle 10 and provide vehicle occupants with comfort and/or entertainment. The vehicle accessories 18 may be interchangeably used with the accessory ports 16 to allow vehicle occupants to easily reconfigure the IP 14 when needed or desired.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An accessory system for a vehicle, the accessory system comprising:
- an accessory port configured to accommodate a plurality of interchangeable modular vehicle accessories, the accessory port comprising:
  - a housing having a base attached to the vehicle; and
  - a projection extending from the base, the projection being fluidly coupled to an air duct of the vehicle,
- wherein:
  - each interchangeable modular vehicle accessory has a respective cavity configured to selectively receive the projection; and
  - the plurality of interchangeable modular vehicle accessories includes a first vehicle accessory configured to provide a first function associated with the air duct of the vehicle, and a second vehicle accessory configured to provide a second function different from the first function and not associated with the air duct of the vehicle.

2. The accessory system of claim 1, wherein the housing includes a first fastener and the first vehicle accessory includes a second fastener, the second fastener engaging the first fastener when the first vehicle accessory is in an engaged state with the housing.

3. The accessory system of claim 2, wherein the first fastener and the second fastener are magnets.

4. The accessory system of claim 1, wherein the housing includes a first electrical contact and the first vehicle accessory includes a second electrical contact, the first electrical contact being electrically coupled to the second electrical contact when the first vehicle accessory is in an engaged state with the housing.

5. The accessory system of claim 1, wherein the projection includes an outer perimeter surface including a plurality of substantially planar surfaces, adjacent substantially planar surfaces of the plurality of substantially planar surfaces being joined to one another at a junction.

6. The accessory system of claim 5, wherein the plurality of substantially planar surfaces cooperate to provide the projection with an octagonal shape.

7. The accessory system of claim 6, wherein the base includes an outer perimeter having an octagonal shape.

8. A vehicle incorporating the accessory system of claim 1.

9. An accessory system for a vehicle, the accessory system comprising:
- a first housing having a first base attached to the vehicle and a first projection extending from the first base;
- a second housing having a second base attached to the vehicle and a second projection extending from the second base, the second housing being spaced apart from the first housing by a first distance;
- a first vehicle accessory having a first cavity configured to selectively receive the first projection of the first housing or the second projection of the second housing to selectively attach the first vehicle accessory to the first housing or the second housing in an engaged state and spaced apart from the first housing and the second housing in a disengaged state, wherein the first vehicle accessory is configured to provide a first function associated with an air duct of the vehicle; and
- a second vehicle accessory having a second cavity configured to selectively receive the first projection of the first housing or the second projection of the second housing to selectively attach the second vehicle accessory to the first housing or the second housing in an engaged state and spaced apart from the first housing and the second housing in a disengaged state, the second vehicle accessory being interchangeable with the first vehicle accessory, wherein the second vehicle accessory is configured to provide a second function different from the first function and not associated with the air duct of the vehicle.

10. The accessory system of claim 9, wherein the first housing and the second housing each includes a first fastener and the first vehicle accessory and the second vehicle accessory each includes a second fastener, the second fastener engaging the first fastener when the first vehicle accessory and/or the second vehicle accessory is in the engaged state.

11. The accessory system of claim 10, wherein the first fastener and the second fastener are magnets.

12. The accessory system of claim 9, wherein the first housing and the second housing each includes a first electrical contact and the first vehicle accessory and the second vehicle accessory each includes a second electrical contact, the first electrical contact being electrically coupled to the second electrical contact when the first vehicle accessory and/or the second vehicle accessory is in the engaged state.

13. The accessory system of claim 9, wherein the first projection and the second projection each includes an outer perimeter surface including a plurality of substantially planar surfaces, adjacent substantially planar surfaces of the plurality of substantially planar surfaces being joined to one another at a junction.

14. The accessory system of claim 13, wherein the plurality of substantially planar surfaces cooperate to provide the first projection and the second projection with an octagonal shape.

15. The accessory system of claim 9, further comprising a third vehicle accessory including a third cavity spaced apart from a fourth cavity by the first distance, the third cavity configured to receive the first projection and the fourth cavity configured to receive the second projection when the third vehicle accessory is in an engaged state and the first vehicle accessory and the second vehicle accessory are in the disengaged state.

16. A vehicle incorporating the accessory system of claim 9.

17. A vehicle comprising:
- an instrument panel;
- a heating, ventilating, and air conditioning (HVAC) system including an air duct supported by the instrument panel;
- an accessory port configured to accommodate a plurality of interchangeable modular vehicle accessories, the accessory port comprising:
  - a housing having a base attached to the instrument panel; and
  - a projection extending from the base, the projection being fluidly coupled to the air duct,
- wherein:

each interchangeable modular vehicle accessory has a respective cavity configured to selectively receive the projection; and the plurality of interchangeable modular vehicle accessories includes a first vehicle accessory configured to provide a first function associated with the air duct of the vehicle, and a second vehicle accessory configured to provide a second function different from the first function and not associated with the air duct of the vehicle.

18. The vehicle of claim 17, wherein the first vehicle accessory includes an aperture in fluid communication with the air duct.

19. The vehicle of claim 18, wherein the housing includes a first fastener and the first vehicle accessory includes a second fastener, the second fastener engaging the first fastener when the first vehicle accessory is in an engaged state with the housing.

20. The vehicle of claim 19, wherein the first fastener and the second fastener are magnets.

* * * * *